(12) United States Patent
Chen

(10) Patent No.: US 7,817,018 B2
(45) Date of Patent: Oct. 19, 2010

(54) CAR ANTITHEFT SYSTEM

(76) Inventor: Tse Hsing Chen, 14Fl., No. 736 Chung-Cheng Rd., Chung-Ho City, Taipei Hsien (TW) 23511

( * ) Notice: Subject to any disclaimer, the term of this patent is extended or adjusted under 35 U.S.C. 154(b) by 187 days.

(21) Appl. No.: 11/984,699

(22) Filed: Nov. 21, 2007

(65) Prior Publication Data

US 2009/0128308 A1    May 21, 2009

(51) Int. Cl.
  *B60R 25/10* (2006.01)
(52) U.S. Cl. .............. 340/426.1; 340/425.5; 340/426.3; 340/426.15; 340/426.13; 340/426.16; 340/427; 180/287; 180/288; 180/289; 307/10.2; 307/10.3; 307/10.4; 307/10.5
(58) Field of Classification Search .............. 340/425.5, 340/426.13, 425.25, 426.25, 426.16, 426.17, 340/426.19, 426.31, 500–693.12, 901, 426.1, 340/425.15, 427; 307/102–105, 10.2–10.5; 180/287–289
  See application file for complete search history.

(56) References Cited

U.S. PATENT DOCUMENTS

| 5,258,741 | A | * | 11/1993 | Fuller | 340/426.31 |
| 6,067,007 | A | * | 5/2000 | Gioia | 340/426.19 |
| 6,548,915 | B1 | * | 4/2003 | Geber et al. | 307/10.2 |
| 2002/0130554 | A1 | * | 9/2002 | Banas et al. | 307/10.3 |
| 2002/0180274 | A1 | * | 12/2002 | Suman | 307/10.2 |
| 2005/0242929 | A1 | * | 11/2005 | Onishi et al. | 340/426.17 |

* cited by examiner

*Primary Examiner*—George A Bugg
*Assistant Examiner*—Sisay Yacob
(74) *Attorney, Agent, or Firm*—Bacon & Thomas, PLLC

(57) ABSTRACT

A car antitheft system includes a main controller invisibly mounted on a car, and an antitheft state indicator embedded in an engine start button of the car and electrically connected to the main controller for indicating a current antitheft state of the car. With these arrangements, the engine start button serves to start the car when the car antitheft system is released, and to indicate the current antitheft state of the car when the car antitheft system is enabled and the antitheft state indicator embedded in the engine start button is lighted, so as to warn and stop a thief from invading the car.

3 Claims, 4 Drawing Sheets

CAR ANTITHEFT SYSTEM

FIELD OF THE INVENTION

The present invention relates to a car antitheft system, and more particularly to a car antitheft system that is integrated with an engine start button of a car, so that the engine start button may serve to start the car and indicate a current antitheft state of the car to warn and stop a thief from invading the car.

BACKGROUND OF THE INVENTION

For the purpose of stopping car thieves, many different means, such as vibration detection, air pressure differential detection, contact switch, etc., have been adopted in conventional car antitheft systems, so that a siren would be actuated to produce loud warning sound and a engine start circuit would be disconnected when a car with the antitheft system in an enabled state is willfully damaged, invaded, or moved. These conventional car antitheft systems have been improved many times and are able to provide other very new and complete functions now, including transmitting a signal to a remote controller carried by the car owner to inform the car owner of the dangerous condition of the car, sending a brief message to the car owner, or providing the car owner with the current car position via a global positioning system.

Most currently available remotely controlled car antitheft systems include an emergency button for releasing the antitheft system in an emergency or a state indicator for indicating a current antitheft state of the car. As shown in FIG. 1, such emergent release button and/or antitheft state indicator installed on a car must be electrically connected to a main controller of the car antitheft system by separately wiring and installation.

On the other hand, most new-generation cars are humanized in design to include kinetic sports-car seats with excellent ergonomics and 10-way powered adjustment, as well as many other novel functions, such as temperature-adjustable venting system, to provide extremely high comfortableness in driving. Moreover, these new-generation cars are provided with an engine start button for starting the car simply by pushing the button.

While these new-generation cars have a scientifically advanced driving cabin to enable simplified and convenient operation of the car, such engine start button has only one single function of starting the car engine without any other usage.

It is therefore tried by the inventor to develop a car antitheft system that is integrated with the novel engine start button, so that the engine start button may serve not only to start the car, but also to indicate a current antitheft state of the car to warn and stop a thief from invading the car.

SUMMARY OF THE INVENTION

A primary object of the present invention is to provide a car antitheft system that is integrated with an engine start button of the car, so that the engine start button is used to start the car when the antitheft system is released, and to indicate the current antitheft state of the car when the antitheft system is enabled, so as to warn and stop a thief from invading the car.

Another object of the present invention is to provide a car antitheft system that can be emergently released via an engine start button of the car by following predetermined procedures when a remote controller for setting the car antitheft system is lost or running out of power.

To achieve the above and other objects, the car antitheft system according to the present invention includes a main controller invisibly mounted on a car, and an antitheft state indicator embedded in an engine start button of the car and electrically connected to the main controller for indicating a current antitheft state of the car. With these arrangements, the engine start button serves to start the car when the car antitheft system is released, and to indicate the current antitheft state of the car when the car antitheft system is enabled and the antitheft state indicator embedded in the engine start button is lighted, so as to warn and stop a thief from invading the car.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 schematically shows the connection of an emergency button and an antitheft state indicator separately to a main controller of a conventional car antitheft system.

DETAILED DESCRIPTION OF THE PREFERRED EMBODIMENTS

Figure 1:
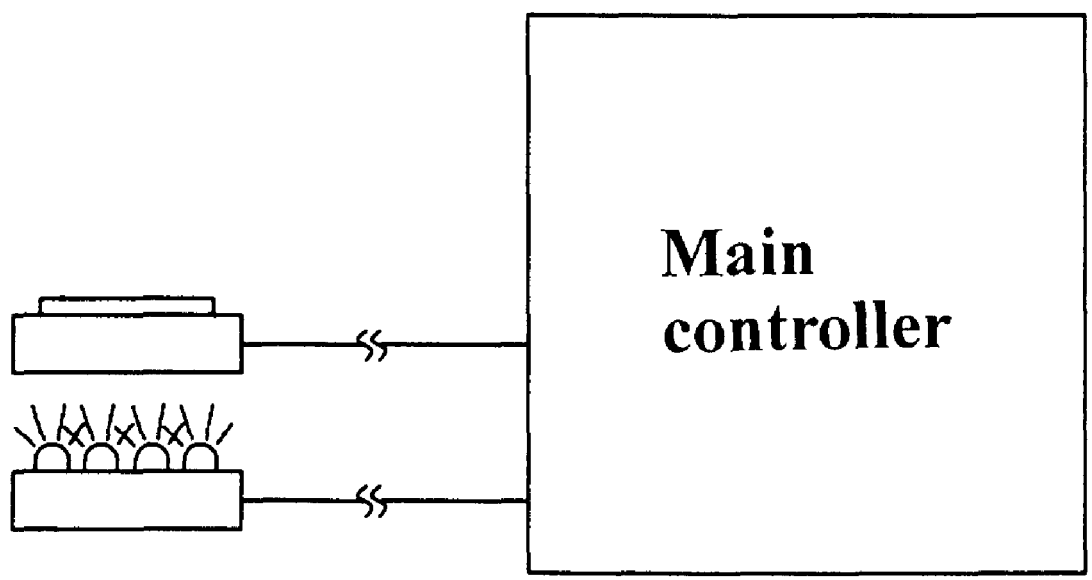
Figure 2:
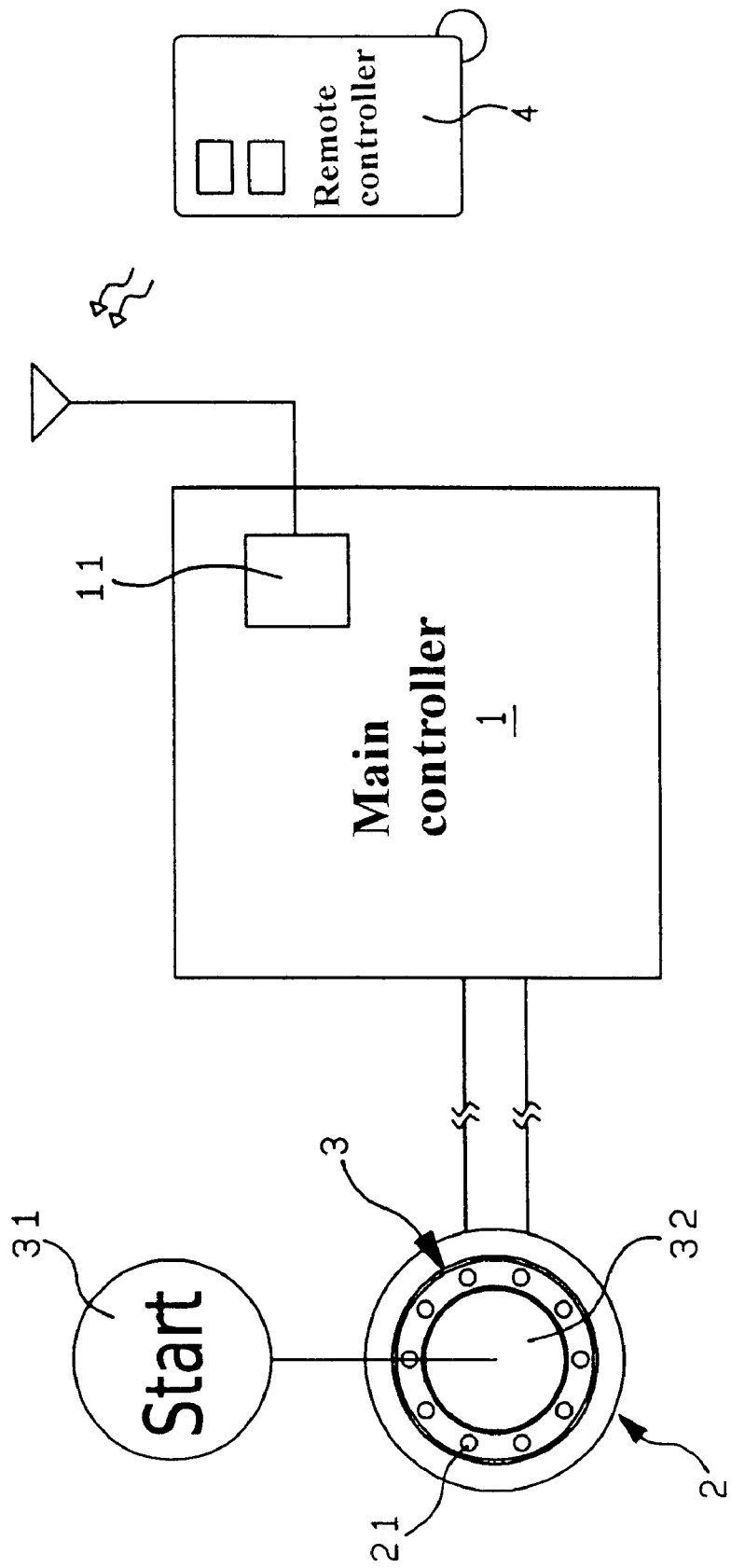
FIG. 2 is an exploded plan view showing a car antitheft system according to a preferred embodiment of the present invention.

Please refer to FIG. 2 that is an exploded plan view showing a car antitheft system according to a preferred embodiment of the present invention. As shown, the car antitheft system according to the present invention includes a main controller 1 invisibly mounted on a car, and an antitheft state indicator 2 embedded in an engine start button 3 and electrically connected to the main controller 1 for indicating a current antitheft state of the car.

Since the antitheft state indicator 2 is effectively associated with the engine start button 3, the installing of the car antitheft system of the present invention may be simplified without adversely affecting an integral appearance of the car interior. Moreover, the antitheft state indicator 2 embedded in the engine start button 3 may have a properly increased area to provide an enhanced warning effect. Therefore, the engine start button 3 serves not only to start the car, but also clearly warn a third person that the car is in an antitheft state when the car antitheft system is enabled to light the antitheft state indicator 2.

Figure 3:
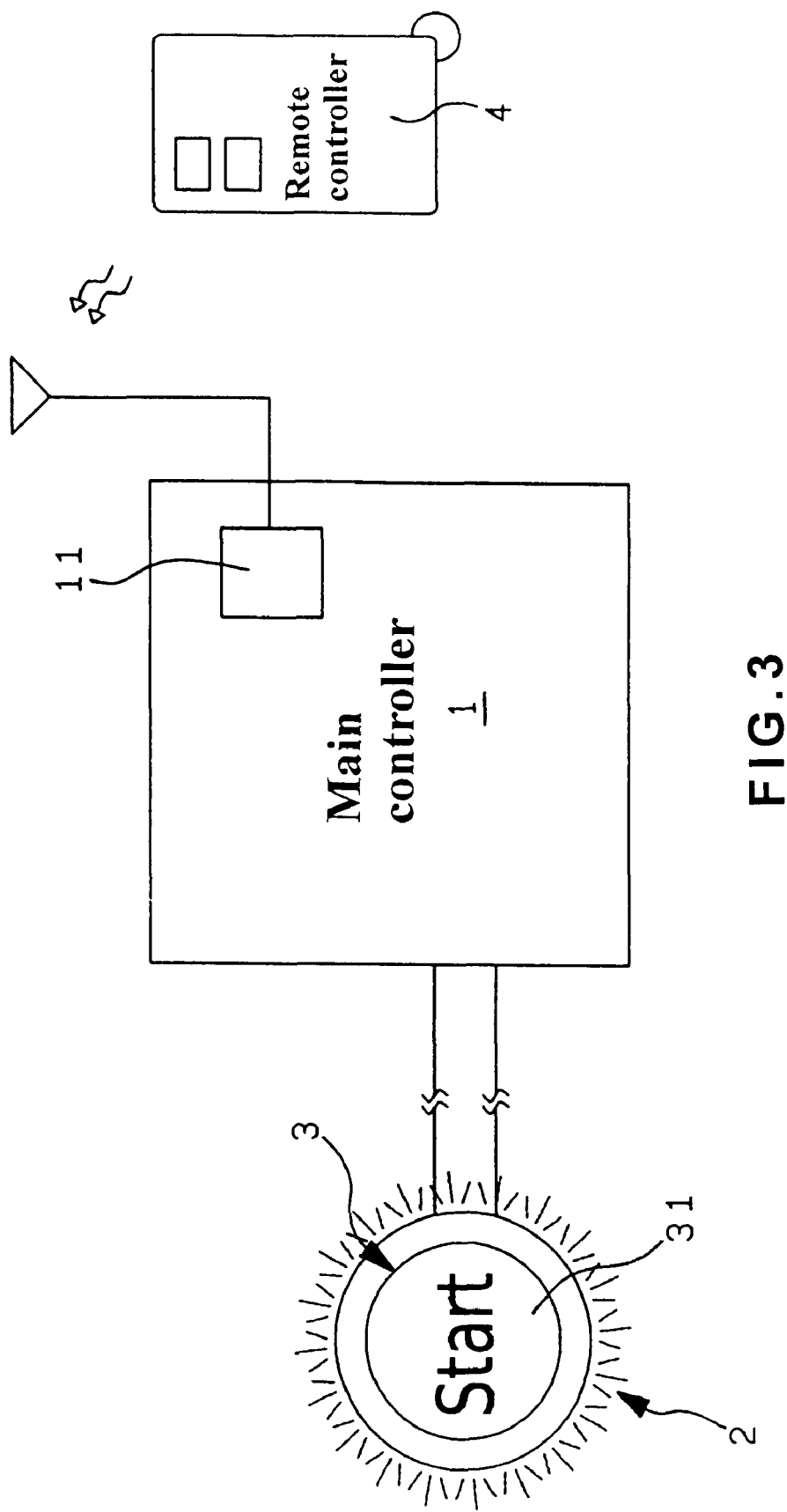
FIG. 3 shows the car antitheft system of the present invention with an antitheft state indictor thereof in a lighted condition.

Please refer to FIGS. 2 and 3 at the same time. The main controller 1 is internally provided with a wireless receiving circuit 11 for receiving a wireless control signal from a remote controller 4, so that the car antitheft system of the present invention may be enabled or released using the remote controller 4. The engine start button 3 is externally provided with a light-pervious face plate 31, and internally provided with a switch 32 and a plurality of indicating lamps 21, which may be light emitting diodes (LEDs) or bulbs. Preferably, the indicating lamps 21 are different color LEDs for indicating different operation modes of the engine start button 3 by different colors. For example, when the green color LEDs are distinguished, it indicates the car antitheft system is released, and green color LEDs are lighted that indicates the engine start button 3 is in a mode for starting the car; and when the red color LEDs are distinguished, it indicates the car antitheft system is enabled and the engine start button 3 is in a mode for showing an antitheft state of the car or for emergently releasing the antitheft system.

Figure 4:
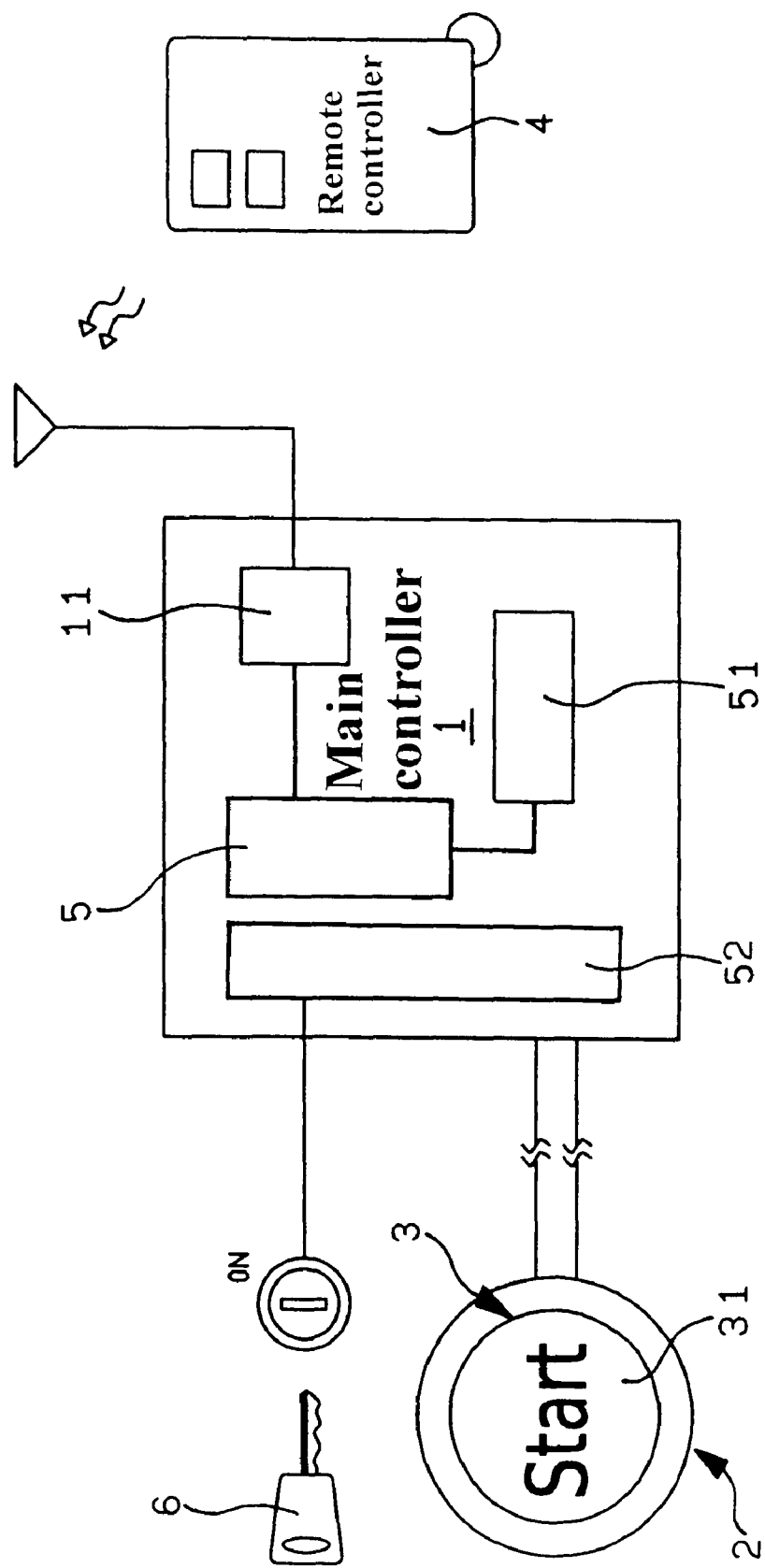
FIG. 4 shows the car antitheft system of the present invention with an CPU and related circuit for emergency release.

Moreover, in the event the car antitheft system could not be released via the remote controller 4, the engine start button 3 may also function as an emergency button for emergently releasing the antitheft system by pushing the button 3 a predetermined procedure and preset number of times. For this purpose, the main controller 1 is internally provided with a CPU circuit 5 electrically connected to an ignition switch of the car and the engine start button 3 through the interface circuit 52, as shown in FIG. 4. To release the car antitheft system via the CPU circuit 5, first insert a correct car key 6 into the ignition switch of the car, and turn the switch to ON; then, push the engine start button 3 a predetermined procedure and preset number of times. The main controller 1 is also internally provided with a memory unit 51 for storing the user-set number of push times thereon. Therefore, a user may set and change the number of times for pushing the engine start button 3 to release the car antitheft system in an emergency, so as to ensure the security of the car antitheft system.

The car antitheft system of the present invention not only integrates different car functions, but also provides the following advantages:

1. The whole system can be conveniently installed without the need of additional wiring in the car. The button 3 not only serves to start the car engine, but also enables the antitheft state indicator 2 to have a large area via the face plate 31 of the button 3. Once the car antitheft system is enabled, the LEDs 21 in the engine start button 3 emit color lights intermittently or in other manners to indicate the car is currently in an antitheft state and thereby warn and stop a third person from invading the car.
2. In the event the remote controller 4 is lost or running out of power, the CPU circuit 5 may be enabled by inserting the car key 6 into the ignition switch and turning the switch to ON, and then pushing the button 3 the predetermined procedure and preset number of times in compliance with specified procedures. Then, the antitheft system is released.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A car antitheft system comprising a main controller and an antitheft state indicator; the main controller being invisibly mounted on a car, and the antitheft state indicator being embedded in an engine start button of the car and electrically connected to the main controller for indicating a current antitheft state of the car; whereby the engine start button serves to start the car engine when the car antitheft system is released, and to indicate the current antitheft state of the car when the car antitheft system is enabled and the antitheft state indicator embedded in the engine start button is lighted, so as to warn and stop a thief from invading the car;

wherein the main controller is internally provided with a CPU and related circuit electrically connected to an ignition switch of the car and the engine start button, whereby when a user inserts a correct car key into the ignition switch and turns the ignition switch to ON, and then pushes the engine start button a predetermined procedure and preset number of times, the car antitheft system can be released in an emergency.

2. The car antitheft system as claimed in claim 1, wherein the engine start button is externally provided with a light-pervious face plate and internally provided with a switch and a plurality of indicating lamps.

3. A car antitheft system comprising a main controller and an antitheft state indicator; the main controller being invisibly mounted on a car, and the antitheft state indicator being embedded in an engine start button of the car and electrically connected to the main controller for indicating a current antitheft state of the car; whereby the engine start button serves to start the car engine when the car antitheft system is released, and to indicate the current antitheft state of the car when the car antitheft system is enabled and the antitheft state indicator embedded in the engine start button is lighted, so as to warn and stop a thief from invading the car;

wherein the engine start button is externally provided with a light-pervious face plate and internally provided with a switch and a plurality of indicating lamps; and wherein the indicating lamps are different color LEDs for indicating different operation modes of the engine start button by different colors, and the different operation modes of the engine start button including at least an engine starting mode, an antitheft state indicating mode, and an emergent releasing mode.

* * * * *